United States Patent Office 2,887,521
Patented May 19, 1959

2,887,521

EXTRACTION PROCESS FOR DIOLEFINS USING COPPER AMMONIUM ACETATE

Douglas S. Alexander and William A. Henry, Sarnia, Ontario, Canada, assignors to Polymer Corporation Limited, Sarnia, Ontario, Canada, a corporation of Canada No Drawing. Application April 30, 1956
Serial No. 581,282

6 Claims. (Cl. 260—681.5)

This invention relates to the separation of hydrocarbons which have approximately the same boiling points but which have different degrees of unsaturation. More particularly, it relates to a solvent which may be used to separate butadiene-1,3 from other hydrocarbons having 4 carbon atoms by selective solvent extraction.

In the preparation of lower molecular weight hydrocarbons by the cracking of other hydrocarbons, the initial product of the cracking process is a mixture of the various hydrocarbons. In the separation of these hydrocarbons into their individual components, the first step usually involves fractional distillation, which, in separating the hydrocarbon mixture into a series of fractions having about the same boiling point, usually results in each boiling point range being itself a mixture of isomers or of other "close boiling hydrocarbons." In this specification "close boiling hydrocarbons" are taken to mean those hydrocarbons whose normal boiling points differ only slightly. Thus it is necessary to separate the "close boiling hydrocarbons" by a procedure other than simple distillation, since the boiling points of such hydrocarbons are so similar.

Various methods have been suggested for the separation of these close boiling hydrocarbons. One method which has been used is extractive distillation. While such method accomplishes the desired results, it suffers a disadvantage in that, for successful execution, large amounts of heat, cooling water and solvent are frequently necessary.

A second method which is frequently used is countercurrent extraction. The solvents normally considered suitable for diolefin extraction include basic ammoniacal cuprous solutions of high copper content, 2 to 5 moles of copper per liter. The copper and ammonia in such solution are combined with an anion that forms a complex which is soluble in aqueous ammonia. The nature of this anion may vary widely, with the only limitation being that it forms a complex cuprous salt that is soluble in strong excess ammonia. Examples of suitable anions include sulfate, phosphate, acetate, lactate, tartrate, formate, nitrate, carbonate, chloride, fluoride, glycolate, benzoate, salicylate, benzene sulfonate, orthophosphate, cyanide, thiocyanate, maleate, etc. Solutions of mixtures of such anions may also be used. Some of these complexes are formed rather slowly, but may be prepared by extensive digesting of the cuprous salt which excess ammonia, or of the ammonia-ammonium salt solution with copper shot and with added oxygen or air. In order to permit use of such solvent in steel equipment, it is necessary to have a trace amount of cupric ions in the strongly basic ammoniacal cuprous anion solutions (pH above 9.0 and preferably in the range of 9.5–12.5). The solution should be fairly concentrated with regard to copper ions, since solutions of copper in which the copper ions are less than 2 moles per liter are not suitable for use in steel. Thus, the solution is one containing at least 2 moles per liter of the cuprous copper with a trace of cupric copper, a slight excess of acid over the stoichiometric requirements of the dissolved copper, together with about 10.5 to 11 moles of ammonia, with the balance water. While this countercurrent extraction has considerable merit, it suffers the disadvantage that the solubility of the desired hydrocarbon in the solvent is often too low under the most desirable operating conditions.

A specific example of countercurrent extraction is the use of copper ammonium acetate to extract butadiene-1,3 from a mixture of $C_4$ hydrocarbons. Copper ammonium acetate, prepared as an aqueous solution containing 2.98 moles of cuprous copper, 0.34 mole of cupric copper, 11.07 moles of ammonia and 5.00 moles of acetic acid per liter of solution, will absorb only about 0.74 mole of butadiene-1,3 per 1000 grams of rich solvent at 37° F. Other solvents, such as those disclosed above, as well as other solvents not containing copper ions, for example, furfural, have been suggested as a substitute for the copper ammonium acetate, but none has seemed to be more satisfactory than the copper ammonium acetate.

It is therefore an object of the present invention to disclose a solvent for the separation of butadiene-1,3 from a mixture of $C_4$ hydrocarbons.

It is a further object of this invention to disclose a solvent for the purification of butadiene-1,3.

These and other objects are achieved according to the present invention, in the process of separating an olefinic hydrocarbon from a mixture of said olefinic hydrocarbon and other saturated and less highly unsaturated hydrocarbons, said hydrocarbon mixture preferably containing 10–95% by weight of said olefinic hydrocarbon, by contacting said hydrocarbon mixture with a solvent selective for the said olefinic hydrocarbon, in the improvement which comprises using, as such solvent, an aqueous ammoniacal solution, containing up to 30 and preferably 10–30 weight percent of the total solution of an alcohol selected from the group consisting of methanol and ethanol, of copper ions with an anion which forms a cuprous salt soluble in the alcoholic ammoniacal solution. Preferably, it contemplates the use of a methanolic or an ethanolic solution of copper ammonium acetate.

While the old copper ammonium acetate solvent could absorb only 0.74 mole of butadiene-1,3 at 37° F., the new copper ammonium acetate solvent of the present invention, containing 25% by weight of methanol absorbs 1.4 moles of butadiene-1,3 at 37° F., an increase of almost 90%. Furthermore, this increase in absorptive capacity, or solubility, of the butadiene-1,3 in the new solvent of the present invention is obtained with only a moderate loss of selectivity, and only a slight increase in tendency towards emulsion formation. In this latter regard, another copending application assigned to the assignee of the present application, is directed to an improved method of inhibiting emulsion formation in such countercurrent extraction techniques.

In this specification, when the term "relative butadiene solubility" (R.B.S.) is used, it is intended to mean the ratio of the solubility of butadiene-1,3 in the new copper ammonium acetate (alcoholic) of the present invention to the solubility of butadiene-1,3 in the old copper ammonium acetate solvent (aqueous). It may be represented thus:

$$R.B.S. = \frac{\text{Solubility in alcoholic copper ammonium acetate}}{\text{Solubility in aqueous copper ammonium acetate}}$$

Furthermore, when the term "selectivity" (S) is used in this specification, it is intended to mean the ratio of the solubility of butadiene-1,3 in the new copper ammonium acetate of the present invention to the solubility of butylene-1 in the same solvent. It may be represented thus:

$$S = \frac{\text{Solubility of butadiene-1,3}}{\text{Solubility of butylene-1}}$$

It is recognized that butylene-1 is only the most soluble of the $C_4$ monoolefins; so the value of S obtained in this ratio is rather a conservative one in actual practice.

The present invention contemplates using low molecular weight alcohols in the preparation of the novel selective solvent. In this specification the term "low molecular weight alcohol" is taken to mean methanol, or ethanol. The alcohol generally preferred is, however, methanol.

Any suitable method for the preparation of the old aqueous copper ammonium acetate may be modified to produce the novel low molecular weight alcoholic copper ammonium acetate of the present invention. One such procedure is given below.

Water and the low molecular weight alcohol are mixed in the ratio of 1 part by weight water to 1 part by weight alcohol. This solution is circulated through an apparatus usually used for the preparation of the conventional copper ammonium acetate, and ammonia vapour is bubbled through the liquid until the concentration of the dissolved ammonia is about 8 moles per liter. Glacial acetic acid is then added slowly until the acid concentration is about 4.5 moles per liter, at which time the ammonium acetate of a suitable concentration is obtained. This solution is then circulated through a bed of copper shot countercurrent to a stream of air, until the solution contains about 3 moles of dissolved cuprous copper. A liter of the resultant alcoholic copper ammonium acetate solution contains about 3 moles of cuprous copper, about 0.3–0.8 mole, usually about 0.35 mole of cupric copper and about 4.5 moles of acetic acid. Due to the stripping action of the air, some gaseous ammonia will escape from the solutions. Hence, it is necessary to add increments of ammonia periodically during the copper dissolution step. An ammonia concentration of 10–12 moles per liter is desirable in the final solution.

It is to be emphasized at this point that the advantages of the present invention are not obtained by the mere addition of the low molecular weight alcohol to a normally prepared aqueous copper ammonium salt solution. The alcohol added must replace an equivalent amount of water or no advantage will be obtained. Thus, it is necessary that, for each unit weight of alcohol added, an equal weight of water must be eliminated.

In carrying out the separation of butadiene-1,3 from a mixture of hydrocarbons containing butadiene-1,3 and other hydrocarbons having a boiling point close to that of butadiene-1,3, the novel solvent of the present invention may be utilized in conventional equipment following known operational procedures. For example, in the purification of butadiene-1,3 from mixture containing butadiene-1,3, butenes, and saturated hydrocarbons, the charge may be contacted in a plate or packed column. Nevertheless, it is more common to perform the separation by means of a series of mixer-settlers.

Generally speaking, the process may be described as follows: The copper solvent enters the first mixer-settler unit at a low temperature (about 0° F.) to extract residual butadiene-1,3 from the hydrocarbon feed which enters the series of mixer-settlers, known as a mixer-settler train, at about its mid-point and flows countercurrent to the solvent. The solvent temperature increases as it travels up the mixer-settler train, with heat being applied in the penultimate and ultimate settlers to desorb the butylenes. The butadiene-1,3 rich solvent leaving the final settler is further heated under reduced pressure to desorb the butadiene-1,3, which is water-washed and then purified by distillation. The desorbed solvent solution is then cooled and recirculated to the absorption train together with the small amounts of ammonia and alcohol recovered by desorption from the water wash-stream.

The following examples are given to illustrate the invention.

EXAMPLE I.—DETERMINATION OF SOLVENT EFFICIENCY

The solubilities of butadiene-1,3 and butylene-1 were determined in aqueous copper ammonium acetate and then in the alcoholic copper ammonium acetate of the present invention, containing various amounts of alcohol. The method was as follows:

50.0 mls. of solvent being tested was pipetted into a 7 ounce bottle which previously had been flushed with nitrogen. 15–20 mls. of the hydrocarbon were then added to the bottle, which was capped with a cap fitted with an oil-resistant rubber gasket and placed into a constant temperature bath held at 0–5° F. The bottle was tumbled end over end in the bath for 15 hours to ensure maximum absorption of the hydrocarbon by the solvent. The saturated copper solution thus obtained was allowed to warm up to the temperature at which the solubility determination was to be made. An accurately measured sample of the solution was heated under vacuum to desorb the dissolved hydrocarbon, the volume of which was then measured in a gas burette under controlled conditions of temperature and pressure.

The results are given below in Table I.

Table 1

SOLUBILITIES OF BUTADIENE-1,3 AND BUTYLENE-1 USING METHANOL

| Solvent | Cu+ | Cu++ | NH₃ | Acid | ° F. | Solubility in Moles per Liter | | Relative Butadiene Solubility | Selectivity |
|---|---|---|---|---|---|---|---|---|---|
| | | | | | | Butadiene | Butylene-1 | | |
| Copper ammonium acetate Aqueous | 2.98 | 0.34 | 11.07 | 5.0 | 37 | 0.74 | 0.15 | 1.00 | 5.2 |
| | | | | | | 0.35 | 0.07 | 1.00 | 5.0 |
| Copper ammonium acetate containing 5% Methanol | 3.04 | 0.33 | 11.50 | 5.0 | 37 | 0.79 | 0.13 | 1.06 | 5.9 |
| | | | | | 90 | 0.37 | 0.07 | 1.05 | 4.9 |
| Copper ammonium acetate containing 10% Methanol | 2.99 | 0.34 | 11.73 | 5.0 | 37 | 0.82 | 0.17 | 1.11 | 4.9 |
| | | | | | 90 | 0.48 | 0.09 | 1.38 | 5.5 |
| Copper ammonium acetate containing 16% Methanol | 2.95 | 0.34 | 11.97 | 5.0 | 37 | 0.93 | 0.20 | 1.25 | 4.6 |
| | | | | | 90 | 0.56 | | 1.59 | |
| Copper ammonium acetate containing 28% Methanol | 2.86 | 0.35 | 12.44 | 5.0 | 37 | 1.47 | 0.36 | 1.98 | 4.0 |
| | | | | | 90 | 1.00 | | 2.86 | |
| Copper ammonium acetate containing 8% Ethanol | 3.09 | 0.25 | 11.21 | 5.0 | 37 | 0.77 | 0.13 | 1.03 | 6.0 |
| | | | | | 90 | 0.39 | 0.08 | | 5.1 |
| Copper ammonium acetate containing 17% Ethanol | 2.96 | 0.31 | 11.17 | 5.0 | 37 | 0.96 | 0.25 | 1.29 | 3.9 |
| | | | | | 90 | 0.52 | 0.14 | | 3.7 |
| Copper ammonium acetate containing 23% Ethanol | 2.83 | 0.36 | 11.13 | 5.0 | 37 | 1.27 | 0.40 | 1.72 | 3.2 |
| | | | | | 90 | 0.83 | 0.28 | | 3.0 |
| Copper ammonium acetate containing 30% Ethanol | 2.74 | 0.39 | 11.10 | 5.0 | 37 | 2.14 | 0.91 | 2.88 | 2.4 |
| | | | | | 90 | 1.64 | 0.65 | | 2.5 |
| Copper ammonium acetate containing 22% Methanol | 2.94 | 0.35 | 12.20 | 5.0 | 37 | 1.19 | 0.27 | 1.60 | 4.4 |
| | | | | | 90 | 0.72 | | 2.05 | |

These results indicate that a substantial gain in butadiene-1,3 solubility and a very small loss in selectivity is obtained using the novel copper ammonium acetate of the present invention instead of the old copper ammonium acetate solvent. There is almost a 100% gain in butadiene-1,3 solubility with a loss of only 28% in selectivity when the copper ammonium acetate solvent containing 28% by weight methanol is used. Moreover, the stability of the solvents of the present invention is very good, with the corrosion rate of steel being no greater than that normally experienced with non-alcoholic aqueous copper solvents.

EXAMPLE II.—CONCENTRATION OF HIGH PURITY BUTADIENE-1,3 STREAMS

The copper ammonium acetate of the present invention, containing various amounts of alcohol, was tested to determine its effectiveness in concentrating a relatively high purity stream of butadiene-1,3, the composition of which varied as follows:

|  | Percent |
|---|---|
| Butadiene-1,3 | 90–92 |
| n-Butylenes | 5–7 |
| Butanes | 1–2 |
| Isobutylene | 0.5–1 |
| Other | 0.5–1 |

Each extraction was performed on a continuous basis by passing the hydrocabon feed stream through a small, steel, rotating disc contactor column six inches in diameter and eight feet high. The extraction zone was five feet long and divided into thirty identical compartments by flat, stationary, annular, stator discs. Each compartment contained a flat, circular, rotor disc, four inches in diameter, attached to a shaft running coaxially with the column so that each rotor disc was located approximately mid way between the stator discs.

In the extraction of butadiene-1,3, the solvent was fed into the top of the column where it was dispersed by a sparger and flowed down the column countercurrently to the rising hydrocarbon stream, which entered through a sparger at the bottom of the column. The solvent was the continuous phase and was removed from the base of the column, while the spent hydrocarbon was removed from the top. Flow rates were measured by calibrated rotameters and the solvent level in the column was controlled by the rate of spent hydrocarbon leaving the column. The results are recorded below in Table II:

Table II

| Methanol Concentration in lean Solvent, Wt. Percent | Rotor Speed, r.p.m. | Butadiene-1,3 in Hydrocarbon Feed, Mol. Percent | Hydrocarbon in Rich Solvent, Wt. Percent | Desorbed Butadiene-1,3 Purity, Mol. Percent |
|---|---|---|---|---|
| 0 | 150 | 90.1 | 0.81 | 92.5 |
| 13.0 | 150 | 91.5 | 2.6 | 95.9 |
| 0 |  | 92.6 | 0.86 | 93.7 |
| 7.4 |  | 90.5 | 3.6 | 94.7 |
| 9.3 |  | 91.1 | 2.7 | 93.3 |
| 10.0 |  | 90.4 | 3.1 | 97.5 |
| 11.3 | 200 | 92.3 | 2.8 | 95.9 |
| 11.7 |  | 90.3 | 3.3 | 97.0 |
| 12.0 |  | 89.1 | 3.2 | 94.6 |
| 13.4 |  | 90.2 | 3.5 | 97.0 |
| 15.2 |  | 90.5 | 3.6 | 95.9 |
| 15.4 |  | 91.0 | 3.7 | 97.0 |
| 0 |  | 92.6 | 0.97 | 94.5 |
| 13.1 | 250 | 90.3 | 3.6 | 97.9 |
| 16.2 |  | 89.8 | 4.1 | 96.5 |
| 17.7 |  | 90.0 | 4.2 | 97.1 |
| 0 |  | 90.1 | 2.0 | 95.8 |
| 16.6 | 300 | 91.6 | 4.3 | 94.3 |
| 17.4 |  | 90.3 | 5.0 | 96.3 |

Total throughput _____ 470 gal./hr./sq. ft.
Solvent to feed ratio _____ 19 to 1 by wt.
Average lean solvent temp. __ 29° F.

These results indicate that butadiene-1,3 solubility increases with increasing methanol concentration and rotor speed and that a satisfactory concentration is obtained even by passing high purity feed only once through a rotating disc contactor column.

EXAMPLE III.—CONCENTRATION OF LOW PURITY BUTADIENE-1,3 STREAMS

The extraction procedure of Example II was repeated using a low purity butadiene feed stream which had the following analysis:

|  | Percent |
|---|---|
| Butadiene-1,3 | 19–23 |
| n-Butylenes | 36.4 |
| Butanes | 30.4 |
| Isobutylene | 11.7 |
| Other | 0.1 |

The results are recorded in Table III.

Table III

| Methanol Concentration in lean Solvent, Wt. Percent | Rotor Speed, r.p.m. | Butadiene-1,3 in Hydrocarbon Feed, Mol. Percent | Hydrocarbon in Rich Solvent, Wt. Percent | Desorbed Butadiene-1,3 Purity, Mol. Percent |
|---|---|---|---|---|
| 11.9 | 100 | 19.5 | 1.2 | 79.8 |
| 14.8 |  | 23.3 | 1.5 | 79.4 |
| 16.0 |  | 19.1 | 1.6 | 76.9 |
| 20.0 |  | 22.1 | 1.8 | 74.1 |
| 12.0 | 200 | 19.1 | 1.4 | 80.2 |
| 15.0 |  | 23.0 | 1.5 | 78.3 |
| 15.8 |  | 19.2 | 1.5 | 78.0 |
| 17.2 |  | 19.6 | 1.3 | 77.0 |
| 18.0 |  | 21.9 | 1.9 | 78.3 |
| 19.6 |  | 22.1 | 1.8 | 74.1 |
| 12.5 | 300 | 18.5 | 1.2 | 79.1 |
| 13.6 |  | 19.8 | 1.2 | 80.0 |
| 16.5 |  | 19.9 | 1.4 | 78.4 |
| 20.0 |  | 22.2 | 1.9 | 75.8 |
| 32.1 |  | 21.4 | 2.3 | 66.0 |
| 13.6 | 400 | 20.3 | 1.4 | 80.9 |
| 16.4 |  | 22.1 | 1.6 | 80.4 |
| 17.6 |  | 18.9 | 1.8 | 70.9 |
| 18.2 |  | 23.4 | 1.8 | 77.8 |
| 26.6 |  | 21.4 | 2.3 | 67.5 |

Total throughput _____ 470 gal./hr./sq. ft.
Solvent to feed ratio _____ 7 to 1 by wt.
Average if a solvent temp. ___ 25° F.

These results indicate that a satisfactory concentration of butadiene-1,3 is obtained even when a low purity stream of butadiene-1,3 is passed only once through a rotating disc contactor column.

It has been found, in the use of the novel copper ammonium acetate solvent of the present invention, that increases of up to 100% in the butadiene-1,3 absorptive capacity over conventional copper ammonium acetate may be obtained. It was found that the maximum throughput of a rotating disc contactor column was increased by about 18%. Furthermore, the solvent of the present invention is very stable since there was no noticeable change in stability or quality after 1100 hours of pilot plant operation.

What we claim is:

1. In the process of separating a diolefinic hydrocarbon from a close-boiling mixture of said diolefinic hydrocarbon and other saturated and less highly unsaturated hydrocarbons by contacting said hydrocarbon mixture with an aqueous copper ammonium acetate solvent, the improvement which comprises replacing the water in said solvent in an amount ranging from 10 to 30% by weight of the solvent with an equal weight of an alcohol selected from the group consisting of methanol and ethanol.

2. In the process of separating butadiene-1,3 from a close-boiling mixture of butadiene-1,3, monoolefins and saturated hydrocarbons by contacting said hydrocarbon mixture with an aqueous copper ammonium acetate solvent, the improvement which comprises replacing the water in said solvent in an amount ranging from 10 to 30% by weight of the solvent with an equal weight of an alcohol selected from the group consisting of methanol and ethanol.

3. In the process of separating butadiene-1,3 from a close-boiling mixture of butadiene-1,3, monoolefins and saturated hydrocarbons by contacting said hydrocarbon mixture with an aqueous cooper ammonium acetate solvent containing about 2.5–3.5 mols of cuprous copper, about 0.15–0.4 mols of cupric copper, about 3–6 mols of acetic acid, and about 9–14 mols of ammonia, said amounts being per liter of aqueous solution, the improvement which comprises replacing the water in said solvent in an amount ranging from 10 to 30% by weight of the solvent with an equal weight of methanol.

4. The process as claimed in claim 3 in which the close-boiling hydrocarbon mixture contains about 10–95% by weight of butadiene-1,3.

5. In the process of separating butadiene-1,3 from a close-boiling mixture of butadiene-1,3, monoolefins and saturated hydrocarbons by contacting said hydrocarbon mixture with an aqueous copper ammonium acetate solvent containing about 2.5–3.5 mols of cuprous copper, about 0.15–0.4 mols of cupric copper, about 3–6 mols of acetic acid, and about 9–14 mols of ammonia, said amounts being per liter of aqueous solution, the improvement which comprises replacing the water in said solvent in an amount ranging from 10 to 30% by weight of the solvent with an equal weight of ethanol.

6. The process as claimed in claim 5 in which the close-boiling hydrocarbon mixture contains about 10–95% by weight of butadiene-1,3.

References Cited in the file of this patent
UNITED STATES PATENTS

| | | |
|---|---|---|
| 2,397,996 | Wilson | Apr. 9, 1946 |
| 2,411,105 | Nixon et al. | Nov. 12, 1946 |
| 2,463,846 | Bain et al. | Mar. 8, 1949 |
| 2,561,822 | Savoy | July 24, 1951 |